(12) United States Patent
Luyster et al.

(10) Patent No.: US 10,400,543 B2
(45) Date of Patent: Sep. 3, 2019

(54) WELLBORE FLUID USED WITH SWELLABLE ELEMENTS

(75) Inventors: Mark Luyster, Houston, TX (US); Matthew Offenbacher, Houston, TX (US)

(73) Assignee: M-I L.L.C., Houston, TX (US)

(*) Notice: Subject to any disclaimer, the term of this patent is extended or adjusted under 35 U.S.C. 154(b) by 0 days.

(21) Appl. No.: 14/118,824

(22) PCT Filed: May 18, 2012

(86) PCT No.: PCT/US2012/038494
§ 371 (c)(1),
(2), (4) Date: Nov. 19, 2013

(87) PCT Pub. No.: WO2012/162117
PCT Pub. Date: Nov. 29, 2012

(65) Prior Publication Data
US 2014/0110119 A1    Apr. 24, 2014

Related U.S. Application Data (60) Provisional application No. 61/488,425, filed on May 20, 2011, provisional application No. 61/589,571, filed on Jan. 23, 2012.

(51) Int. Cl.
| | | |
|---|---|---|
| *E21B 33/12* | (2006.01) | |
| *E21B 33/126* | (2006.01) | |
| *C09K 8/502* | (2006.01) | |
| *C09K 8/504* | (2006.01) | |

(52) U.S. Cl.
CPC ............ *E21B 33/126* (2013.01); *C09K 8/502* (2013.01); *C09K 8/5045* (2013.01); *E21B 33/1208* (2013.01)

(58) Field of Classification Search
CPC . E21B 33/126; E21B 33/1208; C09K 8/5045; C09K 8/502
See application file for complete search history.

(56) References Cited

U.S. PATENT DOCUMENTS

| | | | | |
|---|---|---|---|---|
| 4,366,206 A | * | 12/1982 | Tanaka ................ | A61C 9/0033 428/364 |
| 4,818,288 A | * | 4/1989 | Aignesberger et al. ...... | 106/790 |
| 6,358,580 B1 | | 3/2002 | Mang et al. | |

(Continued)

FOREIGN PATENT DOCUMENTS

| | | |
|---|---|---|
| EA | 200701064 A1 | 10/2007 |
| GB | 2315505 A | 2/1998 |
| WO | 2012162117 A1 | 11/2012 |

OTHER PUBLICATIONS

International Search Report of PCT/US2012/038494 dated Aug. 29, 2012.

(Continued)

*Primary Examiner* — Zakiya W Bates
*Assistant Examiner* — Crystal J Miller
(74) *Attorney, Agent, or Firm* — David J. Smith (57) ABSTRACT

A method for completing a wellbore may include introducing a wellbore fluid into a wellbore, the wellbore fluid having a base fluid; and a solid weighting agent having a d90 of less than 20 microns; where the method may also include contacting the wellbore fluid with a swellable element in the wellbore; and allowing swelling of the swellable element.

16 Claims, 3 Drawing Sheets

(56) References Cited

U.S. PATENT DOCUMENTS

| | | | |
|---|---|---|---|
| 6,586,372 B1 | 7/2003 | Bradbury et al. | |
| 7,143,832 B2 | 12/2006 | Freyer | |
| 7,176,165 B2 | 2/2007 | Massam et al. | |
| 7,717,180 B2* | 5/2010 | Badalamenti et al. | 166/292 |
| 7,849,930 B2 | 12/2010 | Chalker et al. | |
| 7,866,393 B2* | 1/2011 | Badalamenti et al. | 166/292 |
| 7,918,289 B2* | 4/2011 | Oakley | C09K 8/03 166/278 |
| 8,042,618 B2* | 10/2011 | Weaver | C09K 8/28 166/179 |
| 8,252,729 B2* | 8/2012 | Zhang | C09K 8/032 166/305.1 |
| 8,309,497 B1* | 11/2012 | Zhang | C09K 8/032 166/305.1 |
| 8,950,492 B2* | 2/2015 | Maghrabi | C09K 8/36 166/305.1 |
| 9,518,206 B2* | 12/2016 | Maghrabi | C09K 8/36 |
| 2004/0127366 A1 | 7/2004 | Bradbury et al. | 507/100 |
| 2005/0101493 A1 | 5/2005 | Bradbury et al. | |
| 2005/0199401 A1* | 9/2005 | Patel et al. | 166/387 |
| 2005/0277553 A1 | 12/2005 | Massam et al. | |
| 2006/0116294 A1* | 6/2006 | Xiang | C08K 5/053 507/117 |
| 2006/0175065 A1 | 8/2006 | Ross | |
| 2006/0188651 A1 | 8/2006 | Bradbury et al. | |
| 2007/0017676 A1* | 1/2007 | Reddy et al. | 166/295 |
| 2007/0027245 A1 | 2/2007 | Vaidya et al. | |
| 2007/0044963 A1 | 3/2007 | MacDougall | |
| 2007/0151724 A1 | 7/2007 | Ohmer et al. | |
| 2007/0184987 A1* | 8/2007 | Brandbury et al. | 507/140 |
| 2007/0205002 A1 | 9/2007 | Baaijens et al. | |
| 2007/0287637 A1* | 12/2007 | Bradbury et al. | 507/128 |
| 2008/0017376 A1* | 1/2008 | Badalamenti | C04B 28/02 166/292 |
| 2008/0041589 A1* | 2/2008 | Oakley | C09K 8/03 166/278 |
| 2008/0064613 A1* | 3/2008 | Massam | C09K 8/03 507/137 |
| 2008/0125335 A1 | 5/2008 | Bhavsar | |
| 2008/0308283 A1 | 12/2008 | Freyer | |
| 2009/0008095 A1* | 1/2009 | Duncum | C09K 8/032 166/292 |
| 2009/0192052 A1* | 7/2009 | Zhang | C09K 8/032 507/140 |
| 2010/0009874 A1* | 1/2010 | Ballard | C09K 8/03 507/118 |
| 2010/0186956 A1* | 7/2010 | Morgan | C09K 8/506 166/293 |
| 2010/0218949 A1* | 9/2010 | Badalamenti et al. | 166/285 |
| 2011/0036572 A1* | 2/2011 | Weaver | C09K 8/28 166/292 |
| 2011/0036573 A1* | 2/2011 | Weaver | C09K 8/36 166/295 |
| 2011/0136701 A1* | 6/2011 | Prebensen et al. | 507/111 |
| 2012/0175134 A1* | 7/2012 | Robisson | E21B 33/1208 166/387 |
| 2012/0202718 A1* | 8/2012 | Ballard | C09K 8/03 507/121 |
| 2012/0277124 A1* | 11/2012 | Zhang | C09K 8/032 507/117 |
| 2012/0295821 A1* | 11/2012 | Zhang | C09K 8/032 507/136 |
| 2013/0020081 A1* | 1/2013 | Maghrabi | C09K 8/36 166/279 |
| 2014/0110119 A1 | 4/2014 | Luyster et al. | |
| 2014/0162909 A1* | 6/2014 | Ballard | C09K 8/03 507/116 |
| 2014/0357536 A1* | 12/2014 | Maghrabi | C09K 8/36 507/219 |
| 2015/0129215 A1* | 5/2015 | Xu | C22C 1/0408 166/285 |

OTHER PUBLICATIONS

Examination Report issued in AU2012259128 dated May 9, 2014, 3 pages.
Examination Report issued in CA2836582 dated Nov. 14, 2014, 4 pages.
Office Action for the equivalent Egyptian patent application 2013111775 received on Jul. 6, 2015.
Office Action for the equivalent Eurasian patent application 201391740 dated Nov. 5, 2015.
Office Action for the equivalent Eurasian patent application 201391740 dated Apr. 7, 2016.
Examination Report for the equivalent Australian patent application 2015202446 dated Apr. 8, 2016.
Communication pursuant to Article 94(3) for the equivalent European patent application 12723803.8 dated Apr. 12, 2016.
Communication pursuant to Article 94(3) for the equivalent European patent application 12723803.8 dated Apr. 12, 2017.

* cited by examiner

FIG. 1

FIG. 2 *Diagram of measurements*

Figure 3 – Data Measurements

Figure 4 – Vertical Linear Measure of Expansion

Figure 5 – Horizontal Linear Measure of Expansion

Figure 6 – Water Activity vs. Vertical Swelling

WELLBORE FLUID USED WITH SWELLABLE ELEMENTS

BACKGROUND

When completing wells in earth formations, various fluids are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Wellbore fluids or muds may include a base fluid, which is commonly water, diesel or mineral oil, or a synthetic compound. Weighting agents (most frequently barium sulfate or barite is used) may be added to increase density, and clays such as bentonite may be added to help remove cuttings from the well and to form a filtercake on the walls of the hole. Other additives may be added to the wellbore fluids that serve specific functions. For example, surfactants, including lignosulfonates and lignites, keep the mud in a fluid state.

Wellbore fluids also contribute to the stability of the well bore, and control the flow of gas, oil or water from the pores of the formation in order to prevent, for example, the flow, or in undesired cases, the blow out of formation fluids or the collapse of pressured earth formations. The column of fluid in the hole exerts a hydrostatic pressure proportional to the depth of the hole and the density of the fluid. High-pressure formations may require a fluid with a density as high as about 10 ppg and in some instances may be as high as 21 or 22 ppg.

Oil-based muds (OBMs) have been used because of their flexibility in meeting density, inhibition, friction reduction and rheological properties desired in wellbore fluids. The drilling industry has used water-based muds (WBMs) because they are inexpensive. The used mud and cuttings from wells drilled with WBMs can be readily disposed of onsite at most onshore locations. WBMs and cuttings can also be discharged from platforms in many U.S. offshore waters, as long as they meet current effluent limitations guidelines, discharge standards, and other permit limits.

One specific category of wellbore or completion fluids include annular fluids or packer fluids, which are pumped into annular openings in a wellbore such as, for example, (1) between a wellbore wall and one or more casing strings of pipe extending into a wellbore, or (2) between adjacent, concentric strings of pipe extending into a wellbore, or (3) in one or both of an A- or B-annulus in a wellbore comprising at least an A- and B-annulus with one or more inner strings of pipe extending into a said wellbore, which may be running in parallel or nominally in parallel with each other and may or may not be concentric or nominally concentric with the outer casing string, or (4) in one or more of an A-, B- or C-annulus in a wellbore comprising at least an A-, B- and C-annulus with one or more inner strings of pipe extending into a said wellbore, which may be running in parallel or nominally in parallel with each other and may or may not be concentric or nominally concentric with the outer casing string. Yet alternatively, said one or more strings of pipe may simply run through a conduit or outer pipe(s) to connect one or more wellbores to another wellbore or to lead from one or more wellbores to a centralized gathering or processing center; and said annular fluid may have been emplaced within said conduit or pipe(s) but external to said one or more strings of pipe therein.

Such packer fluids primarily serve to protect the casing but also serve to provide hydrostatic pressure in order to equalize pressure relative to the formation, to lower pressures across sealing elements or packers; or to limit differential pressure acting on the well bore, casing and production tubing to prevent collapse of the wellbore, and/or help control a well in the event of a leak in production tubing or when the packer no longer provides a seal or has been unseated. While the packer fluids are formulated with sufficient density to perform such functions, conventionally, solid weighting agents that are often used in other wellbore fluids are avoided in packer fluids due to the concerns of solid settlement, particularly because packer fluids often remain in the annulus for extended periods of time without circulation. Further, in addition to serving the above mentioned conventional functions, for packer elements that are activated by the packer or annular fluid, the fluid is also formulated with such additional consideration in mind.

Another category of wellbore or completion fluids include open hole fluids for uncased portions of the well. The fluids are pumped into a vertical or high angle section of a wellbore where the target producing or injection formation often remains exposed during production or injection and/or may include any of the following: swellable packers, external casing packers, perforated liner, sand control screen, basepipe, and/or selected inflow control devices which may or may not include gauges, control lines and even submersible pumps. Often, the open hole fluid is spotted in the open hole prior to and functions to facilitate the installation of any of the aforementioned. In the example of a swellable packer/polymer(s), the open hole fluid may provide functionality such that the packer/polymer expands, thus providing a barrier to control pressure, movement of fluids and enhance integrity of the lower installation.

According, there is a continuing need for improvements in wellbore fluids to have sufficient density and meet other considerations that may be particularly desirable for use with packer elements and/or swellable polymers used in wellbores and open hole.

SUMMARY

In one aspect, embodiments disclosed herein relate to a method for completing a wellbore that includes introducing a wellbore fluid into a wellbore, the wellbore fluid having a base fluid; and a solid weighting agent having a $d_{90}$ of less than 20 microns; where the method also includes contacting the wellbore fluid with a swellable element in the wellbore; and allowing swelling of the swellable element.

In another aspect, embodiments disclosed herein relate to a method of activating a swellable element that includes, introducing a wellbore fluid into a wellbore through a subterranean formation, the wellbore fluid having an aqueous continuous phase having no more than 10 w/w % dissolved salt content therein; and a solid weighting agent having a $d_{90}$ of less than 20 microns; where the method also includes contacting the wellbore fluid with a swellable element in the wellbore; and allowing swelling of the swellable element.

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and advantages of the invention will be apparent from the following description and the appended claims.

DETAILED DESCRIPTION

Embodiments disclosed herein relate to wellbore fluids (and methods of using such wellbore fluids) for various completion operations. Particularly, embodiments of the present disclosure relate to wellbore fluids used in high density applications to activate swellable polymer compositions of a swellable element. The swellable element (and thus wellbore fluids of the present disclosure) may be used in swellable packer system applications such as, but not limited to, completing wells, plugging or abandoning wells, isolating zones of the well, reservoir compartmentalization or wellbore segmentation.

As mentioned above, the wellbore fluids of the present disclosure may be used to activate a swellable polymer composition having been placed in the borehole as a packer element, in gravel packing, or other applications discussed herein. The swellable composition may either be water-swellable or oil-swellable, whereby the swellable composition swells by diffusion of water or hydrocarbons into the swellable material. However, any type or combination of swellable materials that swell when contacted by any type of fluid may be used in keeping with the principles of this disclosure.

The wellbore fluids of the present disclosure may thus have several components: a continuous phase (i.e., non-oleaginous fluid or oleaginous fluid) selected based on the type of swellable composition such that there is a sufficient amount of the fluid that is free to diffuse into and swell the polymer; and a solid weighting agent having a sufficiently smaller particular particle size range and/or distribution than API grade weighting agents. While solid weighting agents are conventionally avoided in packer fluids, the present disclosure has found that the wellbore fluids of the present disclosure may possess such solid component in a smaller particle size range so that density of the fluid may be achieved without significant settling of the weighting agents.

As used herein, "micronized" refers to particles having a smaller particle size range than API grade weighing agents. Suitable ranges that fall within this classification include particles that are within micron or sub-micron ranges, discussed in more detail below.

Further, in a particular embodiment in which water-swellable compositions are used, the micronized weighting agents may be particularly useful to weight up an aqueous fluid having sufficiently low salinity (discussed in further detail below) so that both density and a high free water content (i.e., a sufficient amount of water molecules to cause swelling of the swellable element) may be achieved. While many water-swellable compositions are stated to be usable with any aqueous fluids, including brines, the inventors of the present disclosure have found that better swelling may be achieved by reducing the salinity and increasing the free water content of the aqueous fluid used with the swellable elements. Further discussion of the wellbore fluid components may be found below.

As mentioned above, the wellbore fluid may be used to activate a swellable packer system or other swellable elements. Swellable packer systems include a swellable composition that may be used to fill a space in the wellbore. The swellable packer system may consist of the swellable composition alone. But in some embodiments, the swellable packer system includes the swellable composition used as a tool component in completion operations where a packer element is placed in a producing interval of the wellbore to provide annular isolation between an upper and lower section of the well. Frequently, the swellable composition is attached to a base pipe, liner, or even the casing. Swelling of the composition may be initiated at any time, but in some embodiments the composition swells at least after the equipment is installed in the well.

Furthermore, swellable compositions are those that swell or expand when exposed to a specific substance or substances, such as water or hydrocarbons, to a size that is larger than the size of the pre-swelled element. The base fluid of the wellbore fluid used in conjunction with the swellable compositions is absorbed into the swellable packer through diffusion. Through the random thermal motion of the atoms that are in the liquid, the fluid diffuses into the packer. When the packer is wrapped around the outer circumference of a tubular, the result of swelling is an increase of the manufactured outside diameter of the swellable packer. The fluid may continue to diffuse into the packer causing the packing element to swell so that it reaches the inside diameter of the casing or the open hole of the well, and will continue to swell until the internal stresses inside the packer material reach equilibrium. That is, the swell pressure increases until diffusion can no longer occur. Particularly, the swellable element may swell at least sufficiently such that the swellable element creates a seal in the annulus, such as a differentially sealing annular barrier that is created between upper and lower sections of the well. Optionally, the swellable packer may be used to create a barrier between designated sections of an open hole to allow selective isolation during completion or post completion. In embodiments, the thickness of the swellable element may swell at least 5%, at least 10%, at least 15%, at least 20%, at least 25%, or at least 50%. Often, the swellable element may be constrained to expand in a radial direction only, but in other embodiments may expand both radially and axially.

Other embodiments may include a swellable element in a bridge plug, which is a tool that can be located and set in a wellbore in order to isolate a lower part of the wellbore from an upper part of the wellbore.

According to a method of use, a swellable packer or other element, such as a bridge plug may placed in a portion of a wellbore. Of course, more than one swellable element may be placed in the wellbore. A combination of swellable packers and/or bridge plugs may also be placed in portions of a wellbore. A swelling fluid is then introduced directly into the annulus itself, or introduced into the annulus via the tubing string or casing. The swelling fluid may be allowed to contact the swellable element of the packer or bridge plug, which causes the swellable element to begin swelling. The swelling fluid may be allowed to remain in contact with the swellable element for a sufficient time for the swellable element to swell and expand to a sufficient size to seal the annulus.

Swellable compositions used in the methods of the present disclosure may be formed from various materials that sufficiently swell or expand in the presence of either water or hydrocarbons. Suitable water-swellable materials include acrylic acid type polymers, carboxymethyl cellulose type polymers, highly swelling clay minerals, isobutylene maleic anhydride, polyethylene oxide polymers, polyvinyl alcohol cyclic acid anhydride graft copolymer, sodium bentonite (montmorillonite), starch polyacrylate acid graft copolymer, starch polyacrylonitrile graft copolymers, vinyl acetate-acrylate copolymers, and combination thereof. More generally, they may also include SAP (Super Absorbent Polymer) or hydrogels.

Suitable hydrocarbon-swellable (oil and/or gas) include, but are not limited to, natural rubbers, nitrile rubbers, hydrogenated nitrile rubber, acrylate butadiene rubbers, polyacrylate rubbers, isoprene rubbers, chloroprene rubbers, butyl rubbers (IIR), brominated butyl rubbers (BIIR), chlorinated butyl rubbers (CIIR), chlorinated polyethylenes (CM/CPE), neoprene rubbers (CR), styrene butadiene copolymer rubbers (SBR), sulphonated polyethylenes (CSM), ethylene acrylate rubbers (EAM/AEM), epichlorohydrin ethylene oxide copolymers (CO, ECO), ethylene-propylene rubbers (EPM and EDPM), ethylene-propylene-diene terpolymer rubbers (EPT), ethylene vinyl acetate copolymer, acrylonitrile butadiene rubbers, hydrogenated acrylonitrile butadiene rubbers (HNBR), fluorosilicone rubbers (FVMQ), silicone rubbers (VMQ), poly 2,2,1-bicyclo heptenes (polynorbornene), and alkylstyrenes. While the specific chemistry is of no limitation to the present methods, swellable compositions commonly used in swellable packer elements include swellable elastomers.

Examples of suitable materials for use as a water-swellable element include, but are not limited to, elastomers such as nitrile, HNBR, fluoroelastomers, or acrylate-based elastomers, or their precursors, if added in variable amounts to an ethylene propylene diene monomer (EPDM) polymer or its precursor monomer mixture, along with a sufficient amount (from about 1 to 10 per hundred rubber "phr") of an unsaturated organic acid, anhydride, or salt thereof, such as maleic acid, optionally combined with a sufficient amount (from about 1 to 10 phr) of an inorganic swelling agent such as sodium carbonate, may produce a water-swellable elastomer having variable low-oil swellability.

Specific examples of water swellable materials are nitrile mixed with a salt or hydrogel, EPDM, or other swelling elastomers available to the petroleum production industry. In other embodiments, additional swellable materials such as super absorbent polyacrylamide or modified crosslinked poly(meth)acrylate can be used. Swellable compositions may also include coatings including organic coatings, e.g. PEEK, nitrile or other plastics, and inorganic materials, e.g. salt ($CaCl_2$), which are readily dissolved with acids. Coatings may be applied to control exposure of the swelling elastomer to water or other swell inducing substances, or to provide complete isolation of the swelling elastomer until the coating is removed by chemical, mechanical or thermal means at a desired time.

As mentioned above, to activate the swellable composition, the wellbore fluid may include a base fluid (including either oleaginous or non-oleaginous fluids). As used herein, the base fluid is the fluid component that provides the wellbore fluid its characteristic of being capable of making a surface water-wet or oil-wet. Often, the base fluid may be a majority component of the fluidic portion of the wellbore fluid. The base fluid used in the wellbore fluid may be an oleaginous (non-aqueous) or non-oleaginous (aqueous) fluid. However, in particular embodiments, a non-oleaginous (aqueous) fluid may be desirable. Further, it is also within the scope of the present disclosure that a combination of oleaginous and non-oleaginous fluids, such as in an emulsion, may be used. In some embodiments, the continuous phase may be non-oleaginous, with an optional oleaginous internal phase, or the fluid may be entirely composed of the non-oleaginous fluid without any oleaginous fluid incorporated therein. In other embodiments, the continuous phase may be oleaginous, with an optional non-oleaginous internal phase, or the fluid may be entirely composed of the oleaginous fluid without any non-oleaginous fluid incorporated therein.

Oleaginous fluids may be a liquid, in some embodiments it is a natural or synthetic oil and in some embodiments, the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Non-oleaginous fluids used in the formulation of the wellbore fluid disclosed herein may be a liquid and in some embodiments is an aqueous liquid (i.e., having water in the system). In some embodiments, the non-oleaginous liquid may be selected from the group including fresh water, sea water, water containing organic and/or inorganic dissolved salts, liquids containing water-miscible organic compounds and combinations thereof. For example, an aqueous fluid may be formulated with mixtures of desired salts in fresh water. Fresh water, as defined herein, is water containing less than 0.05 w/w % salts dissolved there. Brackish water, as defined herein, is water containing from 0.5 w/w % to 3 w/w % salts dissolved therein. Saline water, as defined herein, is water containing from 3 to 5 w/w % salts dissolved therein. Brine, as defined herein, is water containing greater than 5 w/w % salts dissolved therein.

Salts dissolved in water may include, but are not limited to alkali metal and/or alkaline earth halides, hydroxides, or carboxylates, for example. In various embodiments of the wellbore fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given aqueous fluid include any one or more of those present in natural seawater or any other organic or inorganic dissolved salts. Additionally, aqueous fluids that may be used in the wellbore fluids disclosed herein may be natural or synthetic brines, with synthetic brines tending to be much simpler in constitution. In one embodiment, the density of the wellbore fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium. Specific examples of such salts, include but are not limited to, NaCl, $CaCl_2$, NaBr, $CaBr_2$, $ZnBr_2$, $NaHCO_2$, $KHCO_2$, KCl, $NH_4Cl$, $CsHCO_2$, $MgCl_2$, $MgBr_2$, $KH_3C_2O_2$, KBr, $NaH_3C_2O_2$ and combinations thereof.

However, in particular embodiments, the aqueous fluid used as the continuous phase (and without any internal oleaginous phase) with a water-swellable material may have a significantly lower and controlled salt content, as compared to brines conventionally used in wellbore fluid formulation. For example, the salt content of aqueous fluids may generally range from about 0 to about 10% w/w salt; and in particular embodiments, the fluid may include less than 6 w/w % of salt. Thus, the aqueous fluid used in such embodiments may include those classified above as fresh water, brackish water, saline water, or even brine (with controlled salt content), but in particular embodiments, may include fresh water, brackish water, and/or saline water. In other embodiments, the salt content may be such that the molarity of salt in the aqueous liquid may generally range from about 0 to about 2M; however, the fluid may include less than 1.5M in a more particular embodiment.

The term "water activity" ($a_w$) describes the (equilibrium) amount of water available for hydration of materials, such as a swellable element. As solutes, such as salts, are added to water, a quantity of water molecules interacts with such solutes (and surfaces) and is unavailable for other hydration interactions. Thus, a water activity value of unity indicates pure water, whereas zero indicates the total absence of "free" water molecules. Water activity is calculated as the vapor pressure of a liquid divided by that of pure water at the same temperature, in most cases room temperature. In some embodiments, the aqueous fluids used in embodiments disclosed herein may have a water activity ($a_w$) of at least 0.8, at least 0.85, at least 0.87, at least 0.9, at least 0.92, at least 0.94, at least 0.96, at least 0.97, or at least 0.98, up to 1.0, calculated at 25 C and 1 atm. In other embodiments, a water activity (aw) ranging from about 0.927 to about 1, or from about 0.943 to about 0.994, or more particularly greater than about 0.957, calculated at 25 C and 1 atm may be used. The inventors of the present disclosure have found that water activity (describing the equilibrium or amount of water available for hydration or swelling of the swellable packers) should be sufficiently high to allow for a quicker and more effective (sealing strength) activation of the swellable packers. The water activity can be maintained while adjusting the density of the wellbore fluid. The density can be adjusted via the addition of water, micronized weighting agents, additives or combinations thereof.

In addition to the base fluid, the wellbore fluids of the present disclosure may also include a solid weighting agent to arrive at the desired density for the particular wellbore. The density of the fluid may also be increased by incorporation of a solid weighting agent. Solid weighting agents used in some embodiments disclosed herein may include a variety of inorganic compounds well known to one of skill in the art. In some embodiments, the weighting agent may be selected from one or more of the materials including, for example, barium sulphate (barite), calcium carbonate (calcite), dolomite, ilmenite, hematite or other iron ores, olivine, siderite, manganese oxide, and strontium sulphate. In a particular embodiment, calcium carbonate or another acid soluble solid weighting agent may be used.

One having ordinary skill in the art would recognize that selection of a particular material may depend largely on the density of the material as generally, the lowest wellbore fluid viscosity at any particular density is obtained by using the highest density particles. In some embodiments, the weighting agent may be formed of particles that are composed of a material of specific gravity of at least 2.3; at least 2.4 in other embodiments; at least 2.5 in other embodiments; at least 2.6 in other embodiments; and at least 2.68 in yet other embodiments. Higher density weighting agents may also be used with a specific gravity of about 4.2, 4.4 or even as high as 5.2. For example, a weighting agent formed of particles having a specific gravity of at least 2.68 may allow wellbore fluids to be formulated to meet most density requirements yet have a particulate volume fraction low enough for the fluid to be pumpable. However, other considerations may influence the choice of product such as cost, local availability, the power required for grinding, and whether the residual solids or filtercake may be readily removed from the well. In particular embodiments, the wellbore fluid may be formulated with calcium carbonate or another acid-soluble material.

The solid weighting agents may be of any particle size (and particle size distribution), but some embodiments may include weighting agents having a smaller particle size range than API grade weighing agents, which may generally be referred to as micronized weighting agents. Such weighting agents may generally be in the micron (or smaller) range, including submicron particles in the nanosized range.

In some embodiments, the average particle size (d50, the size at which 50% of the particles are smaller) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. In other embodiments, the d90 (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 2 microns, 3 microns, 5 microns, 10 microns, or 15 microns to an upper limit of less than 30 microns, 25 microns, 20 microns, 15 microns, 10 microns, 8 microns, 5 microns, 2.5 microns, 1.5 microns, 1 micron, 700 nm, 500 nm, where the particles may range from any lower limit to any upper limit. The above described particle ranges may be achieved by grinding down the materials to the desired particle size or by precipitation of the material from a bottoms up assembly approach. Precipitation of such materials is described in U.S. Pat. No. 2010/009874, which is assigned to the present assignee and herein incorporated by reference. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In one embodiment, a weighting agent is sized such that: particles having a diameter less than 1 microns are 0 to 15 percent by volume; particles having a diameter between 1 microns and 4 microns are 15 to 40 percent by volume;

particles having a diameter between 4 microns and 8 microns are 15 to 30 by volume; particles having a diameter between 8 microns and 12 microns are 5 to 15 percent by volume; particles having a diameter between 12 microns and 16 microns are 3 to 7 percent by volume; particles having a diameter between 16 microns and 20 microns are 0 to 10 percent by volume; particles having a diameter greater than 20 microns are 0 to 5 percent by volume. In another embodiment, the weighting agent is sized so that the cumulative volume distribution is: less than 10 percent or the particles are less than 1 microns; less than 25 percent are in the range of 1 microns to 3 microns; less than 50 percent are in the range of 2 microns to 6 microns; less than 75 percent are in the range of 6 microns to 10 microns; and less than 90 percent are in the range of 10 microns to 24 microns.

The use of weighting agents having such size distributions has been disclosed in U.S. Patent Application Publication Nos. 2005/0277553 and 2010/0009874, which are assigned to the assignee of the current application, and herein incorporated by reference. Particles having these size distributions may be obtained any means known in the art.

In some embodiments, the weighting agents include dispersed solid colloidal particles with a weight average particle diameter (d50) of less than 10 microns that are coated with a organophilic, polymeric deflocculating agent or dispersing agent. In other embodiments, the weighting agents include dispersed solid colloidal particles with a weight average particle diameter (d50) of less than 8 microns that are coated with a polymeric deflocculating agent or dispersing agent; less than 6 microns in other embodiments; less than 4 microns in other embodiments; and less than 2 microns in yet other embodiments. The fine particle size will generate suspensions or slurries that will show a reduced tendency to sediment or sag, and the polymeric dispersing agent on the surface of the particle may control the interparticle interactions and thus will produce lower rheological profiles. It is the combination of fine particle size and control of colloidal interactions that reconciles the two objectives of lower viscosity and minimal sag.

In some embodiments, the weighting agents may be uncoated. In other embodiments, the weighting agents may be coated with an organophilic coating such as a dispersant, including carboxylic acids of molecular weight of at least 150 Daltons, such as oleic acid and polybasic fatty acids, alkylbenzene sulphonic acids, alkane sulphonic acids, linear alpha-olefin sulphonic acid, and alkaline earth metal salts thereof. Further examples of suitable dispersants may include a polymeric compound, such as a polyacrylate ester composed of at least one monomer selected from stearyl methacrylate, butylacrylate and acrylic acid monomers. The illustrative polymeric dispersant may have an average molecular weight from about 10,000 Daltons to about 200,000 Daltons and from about 17,000 Daltons to about 30,000 Daltons in a more particular embodiment. One skilled in the art would recognize that other acrylate or other unsaturated carboxylic acid monomers (or esters thereof) may be used to achieve substantially the same results as disclosed herein.

When a dispersant coated micronized weighting agent is to be used in water-based fluids, a water soluble polymer of molecular weight of at least 2000 Daltons may be used in a particular embodiment. Examples of such water soluble polymers may include a homopolymer or copolymer of any monomer selected from acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate or salts thereof.

The polymeric dispersant may have an average molecular weight from about 10,000 Daltons to about 300,000 Daltons in one embodiment, from about 17,000 Daltons to about 40,000 Daltons in another embodiment, and from about 200,000-300,000 Daltons in yet another embodiment. One of ordinary skill in the art would recognize that when the dispersant is added to the weighting agent during a grinding process, intermediate molecular weight polymers (10,000-300,000 Daltons) may be used.

In embodiments, the coated weighting agents may be formed by either a dry coating process or a wet coating process. Weighting agents suitable for use in other embodiments disclosed herein may include those disclosed in U.S. Patent Application Publication Nos. 2004/0127366, 2005/0101493, 2006/0188651, 2008/0064613, and U.S. Pat. Nos. 6,586,372 and 7,176,165, each of which is hereby incorporated by reference.

The particulate materials as described herein (i.e., the coated and/or uncoated weighting agents) may be added to a wellbore fluid as a weighting agent in a dry form or concentrated as slurry in either an aqueous medium or as an organic liquid. As is known, an organic liquid may have the environmental characteristics required for additives to oil-based wellbore fluids. With this in mind, the oleaginous fluid may have a kinematic viscosity of less than 10 centistokes (10 mm2/s) at 40° C. and, for safety reasons, a flash point of greater than 60° C. Suitable oleaginous liquids are, for example, diesel oil, mineral or white oils, n-alkanes or synthetic oils such as alpha-olefin oils, ester oils, mixtures of these fluids, as well as other similar fluids known to one of skill in the art of drilling or other wellbore fluid formulation. In one embodiment, the desired particle size distribution is achieved via wet milling of the coarser materials in the desired carrier fluid.

In an embodiment, the wellbore fluid may have a density of greater than about 8.8 pounds per gallon (ppg). In yet another embodiment the density of the wellbore fluid in some embodiments ranges from about 6 to about 18 ppg.

Further, depending on the type of material and/or coating provided thereon, the micronized weighting agents may be classified as water-wet or oil-wet, which can affect compatibility with the base fluid. However, the micronized weighting agents, regardless of their classification, may be used with either a water-based fluid or an oil-based fluid by the use of appropriate additives. For example, it is also within the scope of the present disclosure that a hydrophobic coating (first dispersant) may be provided on micronized weighting agents (causing the particles to be oil-wet), and then an additional surfactant or dispersant (second dispersant) may be incorporated into the wellbore fluid to shift the particles from being oil-wet to water-wet. Such dispersants may include any surfactants that are water soluble, have a hydrophilic-lipophilic balance (HLB) above 8 or 9, and may also include long-chain alcohols and/or mutual solvents. Examples of such surfactants may include, but are not limited to, poly glucosides, ethoxylated alcohols, non-ionic, ionic, anionic, or cationic. In some embodiments, the dispersant is an alkyl poly glucoside surfactant such as ECF-1841 available from M-I LLC (Houston, Tex.).

Conventional methods can be used to prepare the wellbore fluids disclosed herein in a manner analogous to those normally used, to prepare conventional water- and oil-based wellbore fluids. In one embodiment, a desired quantity of base fluid and a suitable amount of one or more micronized weighting agents, as described above, are mixed together and the remaining components of the wellbore fluid added sequentially with continuous mixing.

Other additives that may be included in the wellbore fluids disclosed herein include, for example, wetting agents, organophilic clays, viscosifiers, fluid loss control agents, surfactants, dispersants, interfacial tension reducers, pH buffers, mutual solvents, thinners, thinning agents, and cleaning agents. The addition of such agents should be well known to one of ordinary skill in the art of formulating wellbore fluids and muds.

Figure 1:
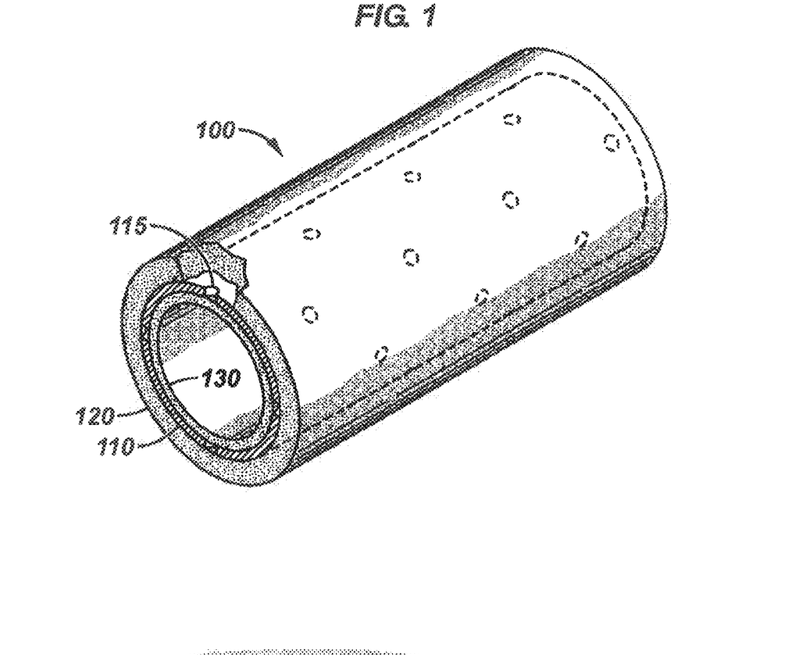
FIG. 1 illustrates an isometric view of an example system in which embodiments of a sealing member can be implemented.

To illustrate an embodiment of a well completion with a swellable packer system, an annular sealing member (packer) is deployed in a wellbore. FIG. 1 depicts an embodiment of an annular sealing member 100 including portions made of the swellable composition. The sealing member 100 can include a support member 110 having an outer swellable element 120 disposed about an outer diameter thereof. The support member 110 can also have an inner swellable element 130 disposed about an inner diameter thereof. The support member 110 can have apertures 115 formed therethrough allowing the outer swellable element 120 to unitize with the inner swellable element 130.

The outer swellable element 120 can be disposed about the support member 110 and can be configured to engage a wall of a wellbore or other structure disposed about the outer swellable element 120. The inner swellable element 130 can be configured to swell within the support member 110 about a tubular or other object at least partially disposed within the support member 110. The swellable elements 120, 130 are unitized, allowing the sealing member 100 to resist differential pressure. The swellable elements 120, 130 can be made of the swellable composition.

After the sealing member 100 is placed in the wellbore around a tubing or drill string, the wellbore fluid is formed by mixing a base fluid and weighting agents along with any other additives that provide for the proper rheological properties required for the well. The wellbore fluid is then pumped downhole (either directly into the annulus or through a tubing string) and allowed to come into contact with the swellable elements disposed in the wellbore (previously or subsequently placed therein). The fluid may diffuse into the swellable elements 120, 130, which swell until the internal stresses inside the polymer reach equilibrium. That is, the swell pressure increases until diffusion can no longer occur. At this point a differentially sealing annular barrier is created between upper and lower sections of the well.

As used herein, a "well" includes at least one wellbore drilled into a subterranean formation, which may be a reservoir or adjacent to a reservoir. A wellbore may have vertical and horizontal portions, and it may be straight, curved, or branched. The wellbore may be an open-hole or cased-hole. In an open-hole wellbore, a tubing string, which allows fluids to be placed into or removed from the wellbore, is placed into the wellbore. In a cased-hole, a casing is placed into the wellbore, and a tubing string can be placed in the casing. An annulus is the space between two concentric objects, such as between the wellbore and casing, or between casing and tubing, where fluid can flow.

Annular sealing members suitable for use in other embodiments disclosed herein may include, but are not limited to, those disclosed in U.S. Patent Application Publication Nos. 2007/0151724, 2007/0205002, 2008/0308283, U.S. Pat. Nos. 7,143,832 and 7,849,930, each of which is hereby incorporated by reference in their entirety. Sealing members can also be used in combination with any other tools where isolation of wellbore segments is desired.

While the illustrated embodiment is one example of many potential applications, it is provided for purposes of explanation. Many other types of applications utilizing a variety of completion equipment, gravel pack techniques and wellbore orientations can benefit from the swellable packer system described. In another embodiment of a well completion, the packer may be incorporated in a screen assembly packer for an open hole completion to utilize the swellable packer to achieve zonal isolation and to block potential undesirable fluid incursion as disclosed in U.S. Patent Application Publication Nos. 2007/0151724, which is hereby incorporated by reference in its entirety.

EXAMPLES

Mixed in the various proportions, the samples included the following components: FLO-VIS™ PLUS, a xanthan gum viscosifier, available from M-I LLC (Houston, Tex.); POWERVIS™, a linear biopolymer, available from M-I LLC (Houston, Tex.); DUAL-FLO™ HT is a modified starch, available from M-I LLC (Houston, Tex.) SAFE-CARB® 10, a calcium carbonate weighting agent, available from M-I LLC (Houston, Tex.); SAFE-CARB® 2, a calcium carbonate weighting agent, available from M-I LLC (Houston, Tex.); EMI-2180, a micronized calcium carbonate weighting agent having a d90 of ~10 microns, a d50 of ~4 microns, and a d10 (the size at which 10% of the particles are smaller) of ~1.5 microns and coated with an organophilic coating made from stearyl methacrylate, butylacrylate and acrylic acid monomers, available from M-I LLC (Houston, Tex.); ECF-1841, a surfactant containing polyglucoside alcohol (or Alkyl ether of corn sugar) and citrus oil, available from M-I LLC (Houston, Tex.); and ECF-2122, a silicon oil defoaming agent containing silica filled silicone oil, polyglycol, and siloxane polyalkyleneoxide polymer (<5%), available from M-I LLC (Houston, Tex.). NaCl (at 5%) and soda ash were incorporated into some formulations.

Four 12.0 ppg water-based systems included: Comparative example 1) 0.5 lb/bbl FLO-VIS™ PLUS and SAFE-CARB® 10 as the weighting agent in freshwater; Example 2) 0.5 lb/bbl FLO-VIS™ PLUS and a blend of 50% SAFE-CARB® 2, 50% SAFE-CARB® 10 as the weighting agents in 5% NaCl; Example 3) 0.5 lb/bbl POWERVIS™ and a blend of 50% SAFE-CARB® 2, 50% SAFE-CARB® 10 as the weighting agents in 5% NaCl; Example 4) 0.5 lb/bbl FLO-VIS™ PLUS and EMI-2180 as the weighting agent in freshwater. The formulations for the Examples are shown in Table 1.

TABLE 1

Formulations of 12.0 lb/gal Swell Systems

| Additive per Final Barrel | Comparative Example 1 | 2 | 3 | 4 |
|---|---|---|---|---|
| Water, BBL | 0.75 | 0.74 | 0.74 | 0.7 |
| Soda Ash, lb | 1 | 1 | 1 | 1 |
| FLO-VIS ™ PLUS, lb | 0.5 | 0.5 | | 0.5 |
| POWERVIS ™, lb | | | 0.5 | |
| DUAL-FLO ™ HT, lb | | 4 | 4 | 4 |
| NaCl, lb | | 14 | 14 | |
| SAFE-CARB ® 2, lb | | 112.5 | 112.5 | |
| SAFE-CARB ® 10, lb | 230 | 112.5 | 112.5 | |
| EMI-2180, lb | | | | 245 |
| ECF-1841, lb | | | | 10 |
| ECF-2122, lb | | | | 0.25 |

Mixing was done at about room temperature with rheology being obtained at about 120° F. as shown in Table 2.

TABLE 2

Rheology of 12.0 lb/gal Swell Systems

| FANN 35 VG-METER READING | Comparative Example 1 | 2 | 3 | 4 |
|---|---|---|---|---|
| 600 rpm | 35 | 75 | 206 | 64 |
| 300 rpm | 24 | 54 | 160 | 40 |
| 200 rpm | 19 | 45 | 140 | 31 |
| 100 rpm | 14 | 35 | 116 | 20 |
| 6 rpm | 7 | 19 | 74 | 5 |
| 3 rpm | 5 | 17 | 71 | 4 |
| 10 sec/10 min gel | 5/5 | 23/25 | 72/79 | 5/7 |
| Plastic Viscosity, cP | 11 | 21 | 46 | 24 |
| Yield Point, lb/100 ft2 | 13 | 33 | 114 | 16 |

Figure 2:
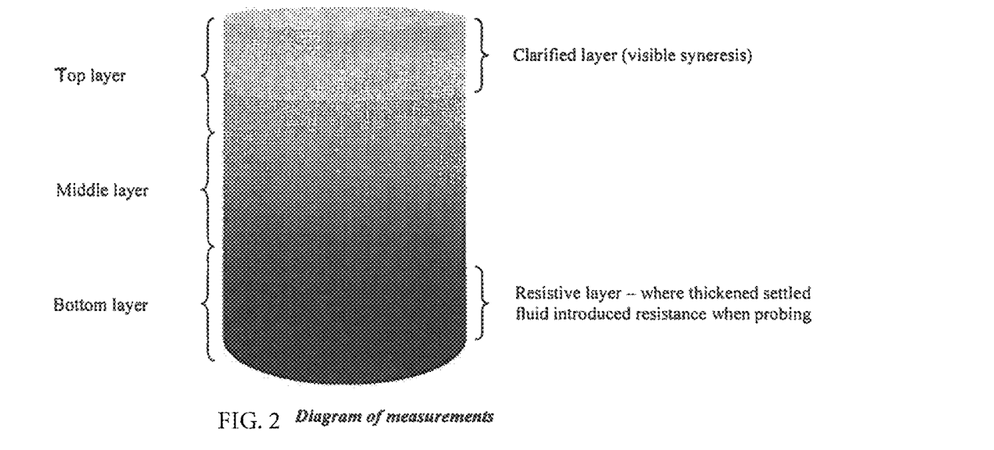
FIG. 2 illustrates a diagram of an example system in which embodiments depicting the various layers were tested during the experimentation of the Examples.

Example 3 was removed from the test matrix due to its incompatibility with the high solids loading. The remaining formulations were placed in oven cells and static aged for 1, 7 and 30 days at 265° F. to evaluate settling characteristics. After static aging, each cell was photographed and the clear phase of fluid was measured for each sample. Solids settling measurement was performed by retrieving a 10 ml samples from the top, bottom and middle fluid layers using a syringe with a long needle and weighing each. The fluid layers are shown in FIG. 2 and the measurements are shown in Tables 3, 4, and 5.

TABLE 3

Separation Characteristics of 12.0 lb/gal Swell Systems After 24 hours

| SETTLING CHARACTERISTICS | Comparative Example 1 | 2 | 4 |
|---|---|---|---|
| Clarified Layer, (inches) | 1.25 | 0.625 | 0.25 |
| Resistive Layer, (inches) | 1.5 | 1.325 | none measured |
| Top Layer Density, SG | 1.014 | 1.084 | 1.125 |
| Middle Layer Density, SG | 1.584 | 1.394 | 1.461 |
| Bottom Layer Density, SG | 1.637 | 1.474 | 1.458 |

TABLE 4

Separation Characteristics of 12.0 lb/gal Swell Systems After 7 days

| SETTLING CHARACTERISTICS | Comparative Example 1* | 2 | 4 |
|---|---|---|---|
| Clarified Layer, (inches) | — | 0.625 | 0.25 |
| Resistive Layer, (inches) | — | 1.75 | none measured |
| Top Layer Density, SG | — | 1.15 | 1.36 |
| Middle Layer Density, SG | — | 1.33 | 1.34 |
| Bottom Layer Density, SG | — | 1.41 | 1.38 |

*The control sample cell leaked and therefore no data was obtained.

TABLE 5

Separation Characteristics of 12.0 lb/gal Swell Systems After 30 days

| SETTLING CHARACTERISTICS | Comparative Example 1 | 2 | 4 |
|---|---|---|---|
| Clarified Layer, (inches) | 1.875 | 0.625 | 0.1875 |
| Resistive Layer, (inches) | 1.75 | 1.375 | none measured |
| Top Layer Density, SG | 1.064 | 1.074 | 1.354 |
| Middle Layer Density, SG | 1.574 | 1.284 | 1.424 |
| Bottom Layer Density, SG | 1.574 | 1.374 | 1.464 |

A probe was placed into the fluid to identify any hard settling. While no packing was observed, there was a slight resistance felt in some samples, referred to as the resistive layer in Tables 3-5. As shown above, Data indicates Example 4 provides the smallest amount of syneresis and density variation.

Next, samples were mixed having a variety of densities based upon the amount of weighting agent. The formulations for the Examples are shown in Table 6.

TABLE 6

Formulations of 12.0 lb/gal Swell Systems

| Additive per Final Barrel | 5 | 6 | 7 | 8 | 9 |
|---|---|---|---|---|---|
| Water, BBL | 0.547 | 0.621 | 0.583 | 0.496 | 0.459 |
| Soda Ash, lb | 1 | 1 | 1 | 1 | 1 |
| FLO-VIS ™ PLUS, lb | 0.5 | 0.5 | 0.5 | 0.5 | 0.5 |
| DUAL-FLO ™ HT, lb | 4 | 4 | 4 | 4 | 4 |
| EMI-2180, lb | 380 | 313 | 347 | 415 | 448 |
| ECF-1841, lb | 10 | 10 | 10 | 15 | 20 |
| ECF-2122, ml | ~1 | ~1 | ~1 | ~1 | ~1 |
| Product Weight, lb | 395.5 | 328.5 | 362.5 | 435.5 | 468.5 |
| Desired Final Density, ppg | 14 | 13 | 13.5 | 14.5 | 15 |

Mixing was done at about room temperature with rheology being obtained at about 120° F. as shown in Table 7.

TABLE 7

Rheology of Swell Systems

| FANN 35 VG-METER READING | 5 | 6 | 8 |
|---|---|---|---|
| 600 rpm | 56 | 67 | TTM* |
| 300 rpm | 36 | 43 | 209 |
| 200 rpm | 30 | 33 | 162 |
| 100 rpm | 21 | 22 | 109 |
| 6 rpm | 6 | 7 | 36 |
| 3 rpm | 5 | 6 | 35 |
| Plastic Viscosity, cP | 20 | 24 | — |
| Yield Point, lb/100 ft2 | 16 | 19 | — |
| 10" | 5 | 5 | 31 |
| 10' | 6 | 6 | 58 |

*TTM denotes "Too thick to measure"

To evaluate the water activity on the swelling properties of a swell material, swell material (FREECAP® elastomer packer available from TAM International, Inc., Houston, Tex.) having a nominal swell limitation of 2.5%/wt NaCl was cut into small coupons for testing. Fourteen fluid samples included the following components: fresh water; EMI-2180, a micronized weighting agent, available from M-I LLC (Houston, Tex.), mixed with water to achieve the desired density; WARP Concentrate, a high density colloidal suspension of micronized barite in a low salinity brine, available from M-I LLC (Houston, Tex.); LVT-200, a mineral oil, available from GEO Drilling Fluids (Bakersfield, Calif.); and NaCl and $CaCl_2$) mixed in various proportions with fresh water. Fluids were mixed according to brine table specification in the M-I SWACO Completion Fluids Manual. The properties for the fluids of the Examples are shown in Table 8.

TABLE 8

Fluid Compositions and Properties

| Sample Number | Sample Tested | Density, lb/gal | Water activity (theoretical) |
|---|---|---|---|
| 9 | Freshwater | 8.33 | 1 |
| 10 | LVT-200 | 6.88 | ~0 |

TABLE 8-continued

Fluid Compositions and Properties

| Sample Number | Sample Tested | Density, lb/gal | Water activity (theoretical) |
|---|---|---|---|
| 11 | EMI-2180 | 12.0 | ~1 |
| 12 | WARP Concentrate | 14.0 | ~1 |
| 13 | 2.7 wt % NaCl | 8.5 | 0.98 |
| 14 | 6.0 wt % NaCl | 8.7 | 0.96 |
| 15 | 9.2 wt % NaCl | 9.2 | 0.9 |
| 16 | 17.1 wt % NaCl | 9.4 | 0.87 |
| 17 | 25.7 wt % NaCl | 10.0 | 0.75 |
| 18 | 5.3 wt % CaCl$_2$ | 8.7 | 0.96 |
| 19 | 9.4 wt % CaCl$_2$ | 9.0 | 0.95 |
| 20 | 16.9 wt % CaCl$_2$ | 9.6 | 0.87 |
| 21 | 26.0 wt % CaCl$_2$ | 10.4 | 0.73 |
| 22 | 39.9 wt % CaCl$_2$ | 11.8 | 0.39 |

Swell material samples were sealed along with fluids in glass jars and static aged at 180° F. Measurements to 0.01 mm via a General 6" Digital Caliper were taken at 1, 3 and 7 days. The mineral oil sample was tested at ambient temperature for safety reasons. Measurements were taken across the top of the swell sample coupon as well as vertically—see FIG. 3. It is believed the vertical measurement is more accurate due to the difficulty in the horizontal measurement due to uneven swelling.

Swelling appeared within hours of initiating the test. The sample in 39.9%/wt CaCl$_2$) floated upon placement. This was also observed in the WARP Concentrate. Over time dehydration occurred, most visible in the WARP samples. The sample was pushed back into the fluid and testing continued. In a downhole environment the packer element would remain submerged and the pressure of the fluid would prevent dehydration at this temperature. Tables 9 and 10 illustrate the swelling as measured vertically and horizontally, respectively.

TABLE 9

Swell Performance (Vertical Measure)

| Sample Number | Sample Tested | Initial Measure, mm | 1 Day, mm | 3 Day, mm | 7 Day, mm |
|---|---|---|---|---|---|
| 9 | Freshwater | 16.14 | 24.49 | 36.31 | 42.19 |
| 10 | LVT-200 | 15.85 | 16.81 | 17.23 | 17.71 |
| 11 | EMI-2180 | 16.12 | 30.29 | 29.52 | 37.10 |
| 12 | WARP Concentrate | 16.36 | 21.18 | 31.42 | 26.22 |
| 13 | 2.7 wt % NaCl | 16.20 | 23.39 | 26.34 | 28.52 |
| 14 | 6.0 wt % NaCl | 16.08 | 21.81 | 24.24 | 24.86 |
| 15 | 9.2 wt % NaCl | 15.97 | 21.31 | 23.54 | 24.36 |
| 16 | 17.1 wt % NaCl | 16.00 | 21.14 | 22.43 | 23.97 |
| 17 | 25.7 wt % NaCl | 16.15 | 20.49 | 30.98 | 21.42 |
| 18 | 5.3 wt % CaCl$_2$ | 16.04 | 18.65 | 19.41 | 20.52 |
| 19 | 9.4 wt % CaCl$_2$ | 15.84 | 18.40 | 19.20 | 19.99 |
| 20 | 16.9 wt % CaCl$_2$ | 16.46 | 17.98 | 18.55 | 18.95 |
| 21 | 26.0 wt % CaCl$_2$ | 16.09 | 16.70 | 16.74 | 17.00 |
| 22 | 39.9 wt % CaCl$_2$ | 16.03 | 16.37 | 16.38 | 16.20 |

TABLE 10

Swell Performance (Horizontal Measure)

| Sample Number | Sample Tested | Initial Measure, mm | 1 Day, mm | 3 Day, mm | 7 Day, mm |
|---|---|---|---|---|---|
| 9 | Freshwater | 26.64 | 46.38 | 50.34 | 53.04 |
| 10 | LVT-200 | 29.04 | 29.46 | 29.52 | 30.00 |
| 11 | EMI-2180 | 25.84 | 33.90 | 49.18 | 48.67 |
| 12 | WARP Concentrate | 28.02 | 34.12 | 36.70 | 38.70 |
| 13 | 2.7 wt % NaCl | 28.82 | 38.67 | 41.35 | 43.58 |
| 14 | 6.0 wt % NaCl | 29.02 | 35.24 | 38.48 | 40.32 |
| 15 | 9.2 wt % NaCl | 26.60 | 21.10 | 34.33 | 35.60 |
| 16 | 17.1 wt % NaCl | 28.09 | 32.59 | 35.36 | 37.30 |
| 17 | 25.7 wt % NaCl | 25.79 | 28.45 | 20.88 | 32.63 |
| 18 | 5.3 wt % CaCl$_2$ | 27.98 | 29.13 | 30.05 | 30.59 |
| 19 | 9.4 wt % CaCl$_2$ | 26.62 | 27.26 | 28.13 | 28.60 |
| 20 | 16.9 wt % CaCl$_2$ | 26.72 | 27.31 | 27.91 | 27.95 |
| 21 | 26.0 wt % CaCl$_2$ | 28.71 | 28.61 | 28.97 | 29.51 |
| 22 | 39.9 wt % CaCl$_2$ | 29.10 | 28.92 | 28.81 | 28.84 |

Figure 3:
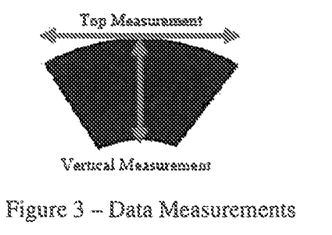
FIG. 3 illustrates a diagram of an example system in which embodiments depicting the various dimensions were measured during the experimentation of the Examples.
Figure 4:
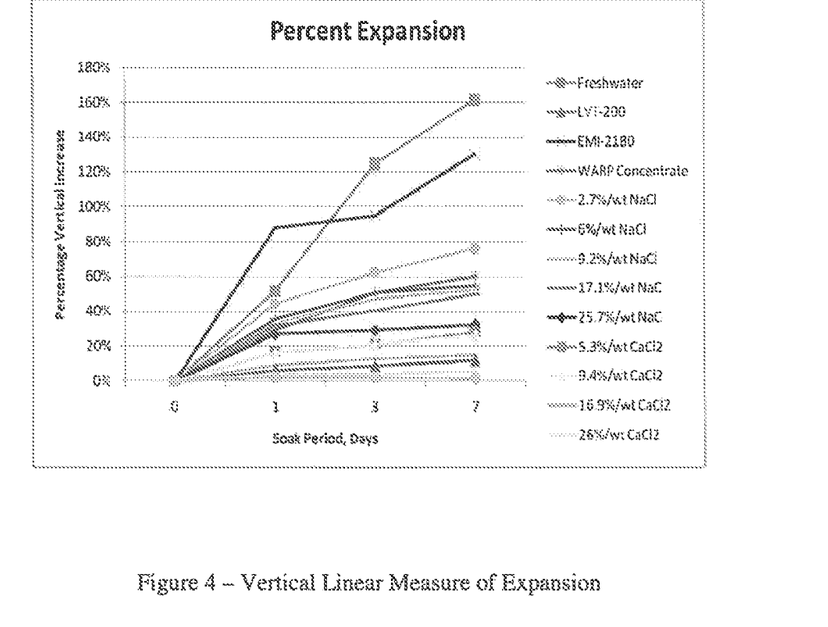
FIG. 4 is a chart that plots percentage vertical swelling as a function of soak days for one or more embodiments.
Figure 5:
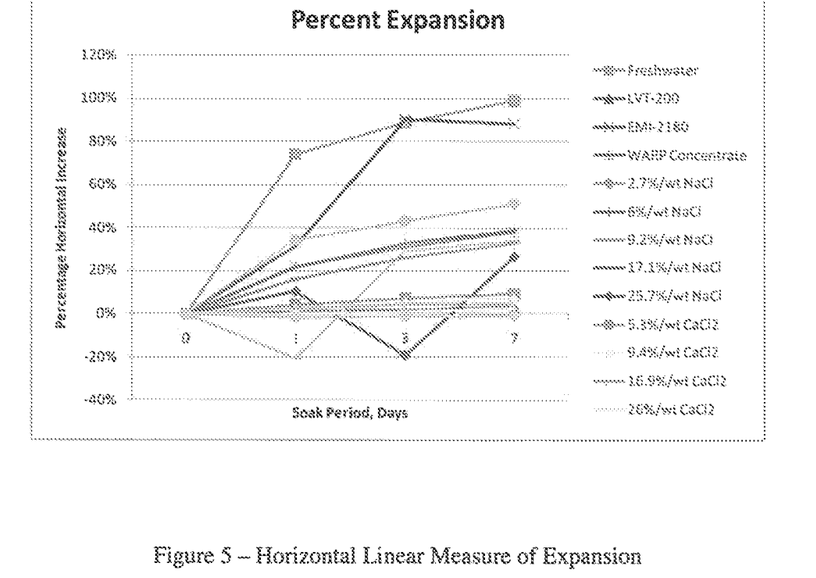
FIG. 5 is a chart that plots percentage horizontal swelling as a function of soak days for one or more embodiments.
Figure 6:
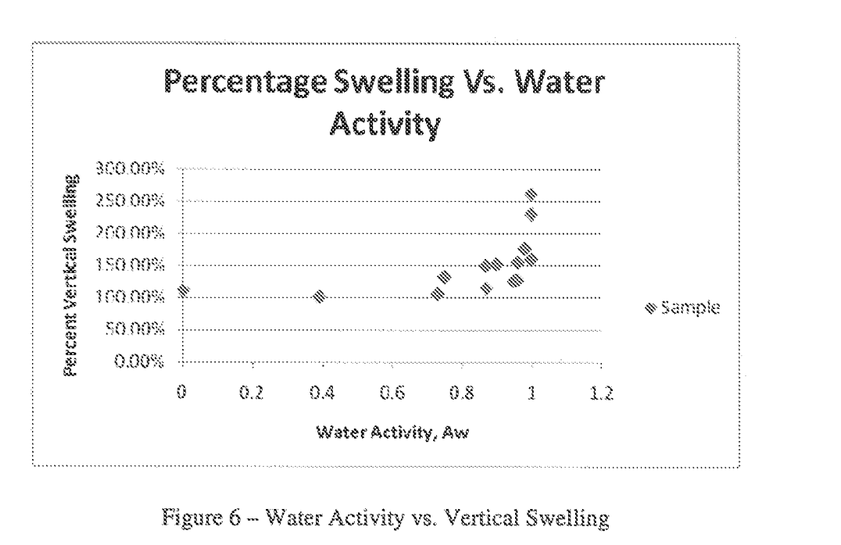
FIG. 6 is a chart that plots percentage vertical swelling as a function of water activity for one or more embodiments.

FIGS. 3 and 4 graphically demonstrate the percentage swell of the systems, with freshwater, EMI-2180, WARP Concentrate and 2.7% NaCl showing greatest swelling. As expected, high salinity (reduced water activity) reduced the swelling ability of the packer elements. The swelling trends clearly demonstrate the performance of the EMI-2180 and WARP Concentrate fluids, particularly at high density where a high salinity brine would be the only alternative. FIG. 6 shows a correlation between water activity and vertical swelling. Fluids having a water activity closer to 1 provide vertical swelling greater than 100%.

Advantageously, embodiments of the present disclosure for a wellbore fluid may be used in completion of a well. Conventionally, requirements for wellbore fluids in completion operations include high density fluids. However, by using micronized weighting agents to increase density, the density of the wellbore fluid is increased while providing an amount of free water to activate swellable compositions. By using the fluids of the present disclosure, a more screen compatible fluid system is used and plugging of the screen may be minimized. Furthermore, the fluids of the present disclosure may enhance hydraulics and lower the requirements of associated equipment. Further, the costs associated with high density clear brines, including disposal, may be eliminated.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for completing a wellbore, comprising:
   providing a wellbore comprising, in case of an open-hole wellbore, a tubing string or, in case of a cased-hole wellbore, a casing and a tubing string in the casing, wherein the wellbore is provided with a tubular component having a swellable element comprising a water-swellable elastomer disposed on an outer circumference of the tubular component, wherein the water-swellable elastomer is selected from the group consisting of nitrile, HNBR, fluoroelastomers or acrylate-based elastomers;
   introducing a wellbore fluid into a wellbore, the wellbore fluid comprising:
     a base fluid having an aqueous continuous phase having from 0 to 10 w/w % salt; and
     a solid weighting agent, having a $d_{90}$ of less than 20 microns, coated with a first dispersant selected from the group consisting of oleic acid, polybasic fatty acids, alkylbenzene sulfonic acids, alkane sulfonic acids, linear alpha-olefin sulfonic acids, alkaline earth metal salts thereof, polyacrylate esters and phospholipids;

contacting the wellbore fluid with the swellable element of the tubular component in the wellbore; and allowing swelling of the swellable element in the wellbore;

wherein the solid weighting agent is added to the wellbore fluid in an amount sufficient to increase the density of the wellbore fluid to at least 8.8 ppg, wherein the wellbore fluid includes less than 5 w/w % dissolved salts.

2. The method of claim 1, wherein the dissolved salts are selected from a group consisting of NaCl, $CaCl_2$, NaBr, $CaBr_2$, $ZnBr_2$, $NaHCO_2$, $KHCO_2$, KCl, $NH_4Cl$, $CsHCO_2$, $MgCl_2$, $MgBr_2$, $KH_3C_2O_2$, KBr, $NaH_3C_2O_2$, and combinations thereof.

3. The method of claim 1, wherein the solid weighting agent is selected from the group consisting of barite, calcium carbonate, dolomite, ilmenite, hematite, olivine, siderite, manganese oxide, hausmannite, and strontium sulfate.

4. The method of claim 1, wherein the solid weighting agent has a particle size $d_{90}$ of less than about 10 microns.

5. The method of claim 1, wherein the solid weighting agent has a particle size $d_{90}$ of less than about 5 microns.

6. The method of claim 1, wherein the wellbore fluid further comprises a second dispersant.

7. The method of claim 1 further comprising positioning the water-swellable element in an uncased interval of the wellbore.

8. The method of claim 1, wherein the tubular component having the swellable element is a swellable packer system.

9. The method of claim 8, wherein the swellable packer system has an outer swellable element and/or an inner swellable element.

10. The method of claim 1, wherein the swellable element, after being allowed to swell, reaches an inside diameter of the casing or the open-hole of the wellbore.

11. A method of activating a swellable element, comprising:

introducing a wellbore fluid having a water activity ranging from about 0.8 to 1 into a wellbore through a subterranean formation, the water activity being calculated as vapor pressure of the wellbore fluid divided by vapor pressure of pure water at the same temperature of the wellbore fluid and the pure water, the wellbore fluid comprising:

an aqueous continuous phase; and a solid weighting agent having a $d_{90}$ of less than 20 microns;

contacting the wellbore fluid with a swellable element in the wellbore; and allowing swelling of the swellable element;

wherein the solid weighting agent is added to the wellbore fluid in an amount sufficient to increase the density of the wellbore fluid to at least 8.8 ppg, where the wellbore fluid includes less than 5 w/w % dissolved salts.

12. The method of claim 11, wherein the solid weighting agent is coated with a first dispersant.

13. The method of claim 12, wherein the first dispersant is selected from the group consisting of oleic acid, polybasic fatty acids, alkylbenzene sulfonic acids, alkane sulfonic acids, linear alpha-olefin sulfonic acids, alkaline earth metal salts thereof, polyacrylate esters, and phospholipids.

14. The method of claim 11, wherein the wellbore fluid further comprises a second dispersant.

15. The method of claim 11, wherein the swellable element is part of a downhole tool.

16. The method of claim 15, wherein the downhole tool is a swellable packer system.

* * * * *